2,780,522
PRODUCTION OF FLUORINE COMPOUNDS

Gunter H. Gloss, Libertyville, and John H. Gross, Mundelein, Ill., assignors to International Minerals & Chemical Corporation, a corporation of New York No Drawing. Application December 17, 1953,
Serial No. 398,866

9 Claims. (Cl. 23—88)

The instant invention relates to the production of fluorine-containing compounds. More particularly, it relates to the production of high grade ammonium fluoride and ammonium bifluoride.

The production of ammonium fluorides has been described by Chappell in U. S. 1,235,552. In this process, den gases containing silicon tetrafluoride were absorbed in water, and ammonia was added to the resulting solution containing fluosilicic acid. Silica which precipitated was separated from the solution containing ammonium fluoride. Alternately, the den gases were directly combined with aqueous ammonia by drawing the gases into towers of suitable construction down which a spray of aqueous ammonia was caused to fall. The liquid was drawn off in the bottom of the tower, and silica which precipitated was separated from the solution containing the ammonium fluoride. By the term "den-gases" is meant the gases which are evolved in the reaction of phosphate rock, apatite, bones, or other phosphatic materials, with sulfuric acid or other acids in the process of making phosphoric acid, calcium phosphate, superphosphate or other phosphatic materials. These gases contain varying amounts of silicon tetrafluoride and, in most cases, entrained phosphate dust particles from the acidulation step.

In the procedures described by Chappell, the ammonia was added to the acidic material. The silica which was precipitated under acidic conditions was in a colloidal or gelatinous form and was separated from the solution only with great difficulty, thereby rendering the process commercially nonfeasible.

This ammonium fluoride product was highly contaminated with phosphatic material because den gases from which the silicon tetrafluoride was obtained, generally contained phosphate dust. When the silicon tetrafluoride was absorbed in water or dilute ammonia, the resulting solution contained fluosilicic acid or a mixture of ammonium fluosilicate or ammonium fluoride, and a major portion of the phosphate rock which was entrained in the den gas. The presence of the phosphate results in the formation of calcium fluoride, which precipitates as a finely divided solid and results in a reduction in the recovery of fluorine from the den gases and also contributes to the difficulty of separating solids from the solution containing the ammonium fluoride. The phosphatic impurities remain in the solution throughout the process and contaminate the ammonium fluoride products.

It is an object of the instant invention to provide improved processes for the production of ammonium fluorides.

It is a further object of the instant invention to provide improved processes for the production of ammonium fluorides which are substantially free of silica.

It is a further object of the instant invention to provide improved processes for the production of high grade ammonium fluoride and ammonium bifluoride.

It is a further object of the instant invention to provide improved processes for the production of fluorine derivatives from den gases, with or without those den gases containing phosphate particles as contaminants.

These and other objects of the instant invention will become more apparent as hereinafter described.

Ammonium fluoride of high purity is produced from an acidic solution of a silico-fluorine compound, such as a fluosilicic acid solution or a fluosilicic acid solution containing up to about 4 moles of ammonia per mole of fluosilicic acid. This fluosilicic acid-containing solution is added to aqueous ammonia in sufficient amount to maintain a minimum pH in the resulting reaction mixture of about 7.5. The temperature of the resulting reaction mixture is maintained at between about the freezing point and about 40° C. during the addition of the acidic solution. Sufficient ammonia is introduced into the reaction container prior to the addition of the fluosilicic acid-containing solution, and if necessary, during the addition, so that the pH in the resulting reaction mixture is substantially always above about 7.5. When the reaction is carried out under these conditions, the silica which is formed is not gelatinous, but is granular or flocculent in its physical form and is relatively easily and rapidly separated from the resulting solution containing the ammonium fluoride. The ammonium fluoride product is substantially free of dissolved or colloidal silica. Ammonium bifluoride is prepared from the ammonium fluoride solution by evaporation of water and ammonia, for example by heating the solution until the boiling temperature at atmospheric pressure has risen to about 125° C. This ammonium fluoride solution is also used for the production of alkali metal and other metallic fluorides.

In a specific embodiment of the instant invention a solution of fluosilicic acid or a solution of fluosilicic acid to which up to about 4 moles of ammonia per mole of fluosilicic acid have been added is introduced into sufficient aqueous ammonia having a concentration between about 5% and about 29%, to maintain a minimum pH of about 7.5, preferably about 8.0. For example, a solution containing between about 12% and about 20% concentration fluosilicic acid is introduced slowly into a reaction vessel containing about 29% ammonia. Generally, the acidic solution containing a fluorine compound is added to the aqueous ammonia at such rate that the temperature of the resulting mixture can be held below about 40° C., preferably below about 30° C. The solution is agitated or stirred during the addition of the acid to the ammonia, so that all silica which forms is precipitated under alkaline conditions. Should the pH of the resulting solution decrease to below about 7.5, additional anhydrous or aqueous ammonia is added in order to maintain the pH above about 7.5, preferably above about 8.0.

The temperature of the resulting solution is maintained between about its freezing point and about 40° C., preferably between about 5° C. and about 30° C. during the addition of the acidic solution to the ammonia. The silica which precipitates is separated from the ammonium fluoride solution, for example by filtration, or by settling. By decreasing the temperature of the reaction mixture, the rate of filtration or of settling of the silica which precipitates is increased.

In another embodiment of the instant invention the ammonium fluorides are prepared from den gases which contain silicon tetrafluoride. The den gases are absorbed in water or in dilute ammonia, and the resulting aqueous solution contains fluosilicic acid or a mixture of ammonium fluosilicate and ammonium fluoride respectively. It has been found that the phosphatic material entrained in the den gases can be removed by scrubbing the gas prior to the absorption in the water or the dilute ammonia by passing the gas through an aqueous solution of sulfuric acid or of fluosilicic acid. The prosphate rock present in the den gas is dissolved or is mechanically removed by this treatment. For example, the den gases are scrubbed in any conventional apparatus for scrubbing gases with liquids, and the resulting effluent gas containing silicon tetrafluoride is substantially free of phosphatic material. The scrubbed gas is then absorbed in water or dilute ammonia to produce respectively a solution of fluosilicic acid or a solution of fluosilicic acid containing up to about 4 moles of ammonia per mole of fluosilicic acid. If desired, solid material is separated from the fluosilicic acid-containing solution prior to reaction with the ammonia. These fluosilicic acid solutions employed for the ammonia reaction generally have a concentration between about 5% and about 25% by weight, preferably between about 12% and about 20% by weight.

In a specific practice of the instant invention an aqueous solution containing between about 70% and about 98% sulfuric acid or an aqueous solution containing between about 18% and about 34% fluosilicic acid is used for the removal of phosphatic material from the den gas. For example, if sulfuric acid is used to scrub the den gas, it eventually will contain phosphorus, silicon tetrafluoride corresponding to the saturation concentration, and small amounts of calcium sulfate, silica, calcium fluoride, and other insoluble impurities in suspension. The entire sulfuric acid slurry or any part of it can be reintroduced into a process for the acidulation of phosphate rock. In one embodiment of the invention, the phosphorus present in the scrubbing solution is returned to the manufacture of acidulated phosphatic materials, such as superphosphates, and the silicon tetrafluoride present in the effluent den gas is suitable for the production of high grade fluorine-containing compounds, such as fluosilicic acid, ammonium fluosilicate, ammonium fluoride, ammonium bifluoride, or other alkali fluosilicates and fluorides.

In a preferred embodiment of the instant invention an aqueous solution containing between about 12% and about 20% concentration of fluosilicic acid, and which is substantially free from phosphatic impurities, is introduced into a reaction vessel into which sufficient aqueous solution containing between about 10% and about 29% ammonia is introduced before, and if necessary, during the addition of fluosilicic acid to maintain a minimum pH of about 8.0 in the resulting reaction mixture. During the addition, the temperature of the resulting mixture is maintained at a temperature between about 5° C. and about 30° C. After completion of the addition of the fluosilicic acid, the silica which precipitated is separated by filtration. The resulting ammonium fluoride solution contains excess ammonia which is separated by heating or by reduction of the pressure. Ammonium bifluoride is prepared from the ammonium fluoride-containing solution by evaporation at a temperature between about 100° C. and about 130° C.

The following examples are presented in order to afford a clearer understanding of the practice of the instant invention, but it is understood that they are illustrative only and there is no intention to limit the invention thereto.

EXAMPLE I

An aqueous solution containing about 24% of fluosilicic acid was added with stirring to an about 29% ammonia aqueous solution over a period of about ½ hour. The resulting reaction mixture reached a maximum temperature of about 29° C. and a final minimum pH of about 8.0. Solid silica was separated from the resulting slurry by filtration. The rate of collection of the resulting Filtrate A is given in Table I below. For comparison, Table I also shows data obtained by adding an aqueous ammonia solution to an aqueous solution of fluosilicic acid. During the addition of the ammonia solution, the maximum temperature was about 25° C. and sufficient ammonia was present so as to give a final maximum pH of about 8.0. The resulting slurry was filtered, and Filtrate B was collected under the same conditions as employed for the collection of Filtrate A.

Table I
TIME FOR FILTRATION OF SILICA

| Time—Minutes | ml. Filtrate A | ml. Filtrate B |
|---|---|---|
| 5 | 24 | 11 |
| 10 | 39 | 19 |
| 15 | 51 | 24 |
| 20 | 53 | 29 |

Table I shows that separation of silica from the Filtrate A containing ammonium fluoride prepared in accordance with the instant invention is considerably more rapid than separation of ammonium fluoride solutions from silica precipitated in conventional processes.

EXAMPLE II

An about 18% fluosilicic acid aqueous solution was added slowly to an about 29% ammonia aqueous solution. During the addition, the maximum temperature of the resulting mixture was between about 20° C. and about 25° C., and the final minimum pH about 8.0. A portion of the resulting slurry was placed in a 100 ml. graduate, and the volume of clear liquid D above the silica which settled was measured at various time intervals.

Sufficient 29% aqueous ammonia solution was added slowly to an about 18% aqueous solution of fluosilicic acid to produce a final maximum pH of 8.0. The maximum temperature during the addition of the ammonia was between about 20° C. and about 25° C. A portion of the resulting slurry was placed in a 100 ml. graduate, and the volume of clear liquid E measured at intervals. Table II shows the volume of clear liquid formed over the settled silica for various time intervals.

Table II
TIME FOR SETTLING OF SILICA

| Time—Minutes | Volume clear liquid—ml. | |
|---|---|---|
| | E | D |
| 10 | 1.5 | 9 |
| 20 | 4.0 | 20 |
| 30 | 6.0 | 29 |
| 40 | 7.0 | 36 |
| 60 | 13.5 | 39.5 |
| 80 | 22.0 | 40 |
| 90 | 24.5 | 40 |

Table II shows that the rate at which the silica settles from the ammonium fluoride solution is much more rapid when it is precipitated in accordance with the instant process.

EXAMPLE III

Table III shows the speed of collecting filtrates containing ammonium fluoride prepared in the same manner as Filtrate A in Example I, with the exception that in preparing Filtrates E and F, the maximum temperatures of the reaction mixtures were about 29° C. and about 15° C., respectively.

Table III
EFFECT OF REACTION TEMPERATURE ON FILTRATION RATE

| Time—Minutes | ml. E (29° C.) | ml. F (15° C.) |
|---|---|---|
| 2 | 10 | 20 |
| 3 | 15 | 33 |
| 4 | 20 | 41 |
| 5 | 24 | 47 |
| 7 | 30 | 53 |
| 10 | 39 | |
| 15 | 51 | |
| 20 | 53 | |

Having thus fully described and illustrated the character of the instant invention, what is desired to be protected by Letters Patent is:

1. A process for the production of fluorine-containing compounds which comprises adding an aqueous fluosilicic acid-containing solution to sufficient aqueous ammonia to maintain a pH above 7.5 in the resulting reaction mixture, while maintaining the temperature of said mixture between about the freezing point and about 40° C., and separating the resulting granular silica which precipitates from the resulting ammonium fluoride solution.

2. A process for the production of fluorine-containing compounds which comprises adding an aqueous acidic solution of a fluorine compound selected from the group consisting of fluosilicic acid and a fluosilicic acid solution containing up to about 4 moles of ammonia per mole of said acid to sufficient aqueous ammonia to maintain a pH above 7.5 in the resulting reaction mixture, while maintaining the temperature of said mixture between about the freezing point and about 40° C., and separating the resulting granular silica which precipitates from the resulting ammonium fluoride solution.

3. A process for the production of fluorine-containing compounds which comprises adding an aqueous acidic solution of a fluorine compound selected from the group consisting of fluosilicic acid and a fluosilicic acid solution containing up to about 4 moles of ammonia per mole of said acid to sufficient aqueous ammonia having a concentration between about 15% and about 29% to maintain a pH between about 8.0 and about 11.0 in the resulting reaction mixture, while maintaining the temperature of said mixture between about the freezing point and about 40° C., and separating the resulting granular silica which precipitates from the resulting ammonium fluoride solution.

4. A process for the production of fluorine-containing compounds which comprises passing den gas containing silicon tetrafluoride through sufficient acid solution selected from the group consisting of aqueous sulfuric acid and aqueous fluosilicic acid, passing the resulting effluent gases into an aqueous solution, adding the resulting acidic solution to sufficient aqueous ammonia to maintain a pH above 7.5 in the resulting mixture, while maintaining the temperature of the resulting mixture at between about the freezing point and about 40° C., and separating the resulting granular silica which precipitates from the resulting solution.

5. A process for the production of fluorine-containing compounds which comprises passing den gas containing silicon tetrafluoride and containing phosphate rock particles as a contaminant through aqueous fluosilicic acid, having a concentration between about 18% and about 34%, passing the resulting effluent gases into an aqueous solution selected from the group consisting of water and dilute aqueous ammonia, adding the resulting acidic solution to sufficient aqueous ammonia to maintain a pH of above 7.5 in the resulting mixture, while maintaining the temperature of the resulting mixture at between about the freezing point and about 40° C., and separating the resulting granular silica which precipitates from the resulting ammonium fluoride solution.

6. A process for the production of fluorine-containing compounds which comprises passing den gas containing silicon tetrafluoride and containing phosphate rock particles as a contaminant through aqueous sulfuric acid having a concentration between about 50% and about 98%, absorbing the resulting effluent gases in water, adding the resulting acidic solution to sufficient aqueous ammonia to maintain a pH above 7.5 in the resulting mixture, while maintaining the temperature of the resulting mixture at between about 5° C. and about 30° C., separating the resulting granular silica which precipitates from the resulting solution, evaporating excess ammonia from the resulting ammonium fluoride solution, and heating the resulting solution to obtain ammonium bifluoride.

7. A process for the production of fluorine-containing compounds which comprises adding an aqueous solution of a fluorine compound selected from the group consisting of fluosilicic acid solution and a fluosilicic acid solution containing up to about 4 moles of ammonia per mole of said acid to sufficient aqueous ammonia to maintain a pH above 7.5 in the resulting reaction mixture, while maintaining the temperature of said mixture between about the freezing point and about 40° C., separating the resulting granular silica which precipitates from the resulting ammonium fluoride solution, evaporating excess ammonia from the resulting solution, and heating the resulting solution to obtain ammonium bifluoride.

8. A process for the production of fluorine-containing compound which comprises adding an aqueous fluosilicic acid-containing solution having a concentration between about 5% and about 25% and contaminated with phosphate rock particles to sufficient aqueous ammonia to maintain the pH of the resulting mixture above 7.5, while maintaining the temperature of said mixture at between about its freezing point and about 30° C., and separating the resulting granular silica which precipitates from the resulting ammonium fluoride solution.

9. A process for the production of fluorine-containing compounds which comprises adding an aqueous fluosilicic acid-containing solution having a concentration between about 5% and about 25% to sufficient aqueous ammonia having a concentration between about 15% and about 29% to maintain the pH of the resulting mixture above 7.5, while maintaining the temperature of said mixture at between about its freezing point and about 30° C., and separating the resulting granular silica which precipitates from the resulting ammonium fluoride solution.

References Cited in the file of this patent

UNITED STATES PATENTS

| | | |
|---|---|---|
| 1,235,552 | Chappell | Aug. 7, 1917 |
| 2,385,208 | Jones | Sept. 18, 1945 |
| 2,447,359 | Oakley | Aug. 17, 1948 |
| 2,584,894 | MacIntyre | Feb. 5 1952 |

OTHER REFERENCES

J. W. Mellor's "A Comprehensive Treatise on Inorganic and Theoretical Chem.," vol. 2, 1922 ed., page 520. Longmans, Green & Co., N. Y.